(12) United States Patent
Mittal et al.

(10) Patent No.: US 11,373,145 B2
(45) Date of Patent: Jun. 28, 2022

(54) TECHNOLOGY FOR CANDIDATE INSIGHT EVALUATION

(71) Applicant: International Business Machines Corporation, Armonk, NY (US)

(72) Inventors: Shilpa Bhagwatprasad Mittal, Pune (IN); Shailendra Moyal, Pune (IN); Akash U. Dhoot, Pune (IN); Venkata Vara Prasad Karri, Visakhapatnam (IN); Nitika Sharma, Pabhat (IN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/776,434

(22) Filed: Jan. 29, 2020

(65) Prior Publication Data

US 2021/0233029 A1    Jul. 29, 2021

(51) Int. Cl.
*G06Q 10/10* (2012.01)

(52) U.S. Cl.
CPC ................ *G06Q 10/1053* (2013.01)

(58) Field of Classification Search
CPC ........ G06Q 10/1053; G06Q 10/063112; G06F 16/436; G06F 8/30; G06F 8/65; G06F 11/3668; G06N 20/00
See application file for complete search history.

(56) References Cited

U.S. PATENT DOCUMENTS

| | | | |
|---|---|---|---|
| 8,930,398 B1 * | 1/2015 | Kishore | G06F 16/9024 707/780 |
| 9,256,784 B1 * | 2/2016 | Taylor | G06F 3/0304 |
| 2010/0039618 A1 * | 2/2010 | De Lemos | G06V 40/19 351/209 |
| 2010/0161503 A1 * | 6/2010 | Foster | G06Q 10/1053 705/321 |
| 2012/0237084 A1 * | 9/2012 | De Lemos | G06K 9/00604 382/103 |
| 2013/0005443 A1 | 1/2013 | Kosta | |

(Continued)

FOREIGN PATENT DOCUMENTS

WO    2019018335 A1    1/2019

OTHER PUBLICATIONS

Pan, Bing, et al. "The determinants of web page viewing behavior: an eye-tracking study." Proceedings of the 2004 symposium on Eye tracking research & applications. 2004. (Year: 2004).*

(Continued)

*Primary Examiner* — Richard W. Crandall
*Assistant Examiner* — Corey Russ
(74) *Attorney, Agent, or Firm* — Anthony V. S. England; Robert Bean; Susan M. Maze

(57) ABSTRACT

A computer system provides, via a network, information to an employment candidate regarding an available job, including a description of the job and questions for the candidate, wherein the information is configured for presentation on a device used by the candidate. The computer system receives from the device via the network and in response to the information being presented to the candidate, answers of the candidate and inputs indicating actions of the candidate other than the answers. The computer system determines, responsive to the inputs, a metric indicating an evaluation of the candidate.

12 Claims, 10 Drawing Sheets

(56) References Cited

U.S. PATENT DOCUMENTS

| | | | | |
|---|---|---|---|---|
| 2013/0012788 | A1* | 1/2013 | Horseman | G16H 50/30 |
| | | | | 600/301 |
| 2013/0290207 | A1 | 10/2013 | Bonmassar | |
| 2014/0172732 | A1* | 6/2014 | Baladi | G06Q 10/1053 |
| | | | | 705/321 |
| 2014/0244612 | A1 | 8/2014 | Bhasin | |
| 2014/0358810 | A1* | 12/2014 | Hardtke | G06Q 10/105 |
| | | | | 705/321 |
| 2015/0046357 | A1* | 2/2015 | Danson | G06Q 10/1053 |
| | | | | 705/321 |
| 2015/0112765 | A1 | 4/2015 | Sundaresh | |
| 2015/0242486 | A1 | 8/2015 | Chari | |
| 2015/0310392 | A1* | 10/2015 | Wu | G06Q 10/1053 |
| | | | | 705/321 |
| 2015/0310393 | A1 | 10/2015 | Bhaskaran | |
| 2016/0063442 | A1 | 3/2016 | Bennett | |
| 2016/0071061 | A1* | 3/2016 | Biddle | G06Q 10/1053 |
| | | | | 705/321 |
| 2016/0162912 | A1 | 6/2016 | Garel | |
| 2017/0024701 | A1* | 1/2017 | Tang | G06F 16/9535 |
| 2017/0213190 | A1 | 7/2017 | Hazan | |
| 2018/0121880 | A1 | 5/2018 | Zhang | |
| 2019/0089701 | A1* | 3/2019 | Mercury | G06F 3/011 |
| 2020/0278279 | A1* | 9/2020 | Wilks | G01N 30/06 |
| 2021/0150485 | A1* | 5/2021 | Ghosh | G06N 20/00 |
| 2021/0279668 | A1* | 9/2021 | Mikhajlov | A61B 5/1128 |

OTHER PUBLICATIONS

"Predicting buying behavior using Machine Learning: A case study on Sales Prospecting (Part I)," Rudradeb Mitra, Jan. 12, 2018, https://becominghuman.ai/predicting-buying-behavior-using-machine-learning-a-case-study-on-sales-prospecting-part-i-3bf455486e5d.

"Shopper Research," tobiipro website, https://www.tobiipro.com/fields-of-use/marketing-consumer-research/shopper-research, screenshot downloaded Nov. 11, 2019.

"How Eye Tracking Can Unlock Consumer Insights," Mike Bartels, Dec. 16, 2018, https://progressivegrocer.com/how-eye-tracking-can-unlock-consumer-insights.

"The NIST Definition of Cloud Computing," NIST Special Publication 800-145, National Institute of Standards and Technology, http://csrc.nist.gov/groups/SNS/cloud-computing/index.html, Sep. 28, 2011.

\* cited by examiner

Admin Executive                                                                 ✕

Apply Now    ♡

- Keep a track of Housekeeping, Stationary and other material and prepare Purchase Order as per requirement
- Take approval from VP-HR&Admin before placing any purchase order
- Maintain & Update inventory MIS on daily basis and reconcile the statement with actual stock every Saturday
- Monitor office material supply and research for getting advantageous deals / vendors Responsibilities and Duties Desired Experience: Minimum 3-5 years of experience in Admin & Transport function
Required Experience and Qualifications
Required Experience, Skills and Qualifications
Qualification

- Any Graduate
- Good knowledge of city routes
- Ready to work in night shifts
- Good MS-Office experience
- Effective Communication skil
- Desired Experience: Minimum 3-5 years of experience in Admin & Transport function Benefits
Other Details:

- Salary – As per Industry Standards (based on experience)
- Rotational Shift
- 6 days working
- No fixed Off
- He should have Bike Job Type: Full-time Experience:

- work: 1 year (Preferred)

Education:

- Secondary(10th Pass) (Preferred)

*Figure 5*

TECHNOLOGY FOR CANDIDATE INSIGHT EVALUATION

BACKGROUND

Job searches, job applications and job interviews are frequently done online.

SUMMARY

In an embodiment of the present invention, a computer system implemented method for determining at least one metric for an employment candidate includes providing to an employment candidate, by a computer system via a network, information regarding an available job, wherein the information includes a description of the job and questions for the candidate and wherein the information is configured for presentation on a device used by the candidate. The computer system receives from the device, via the network and in response to the information being presented to the candidate, answers of the candidate and inputs indicating actions of the candidate other than the answers. The computer system determines, responsive to the inputs, a metric indicating an evaluation of the candidate.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein:

FIG. 5 illustrates a job description 500 that an employer has posted on an Internet job portal for viewing by a candidate, according to an embodiment of the present invention;

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
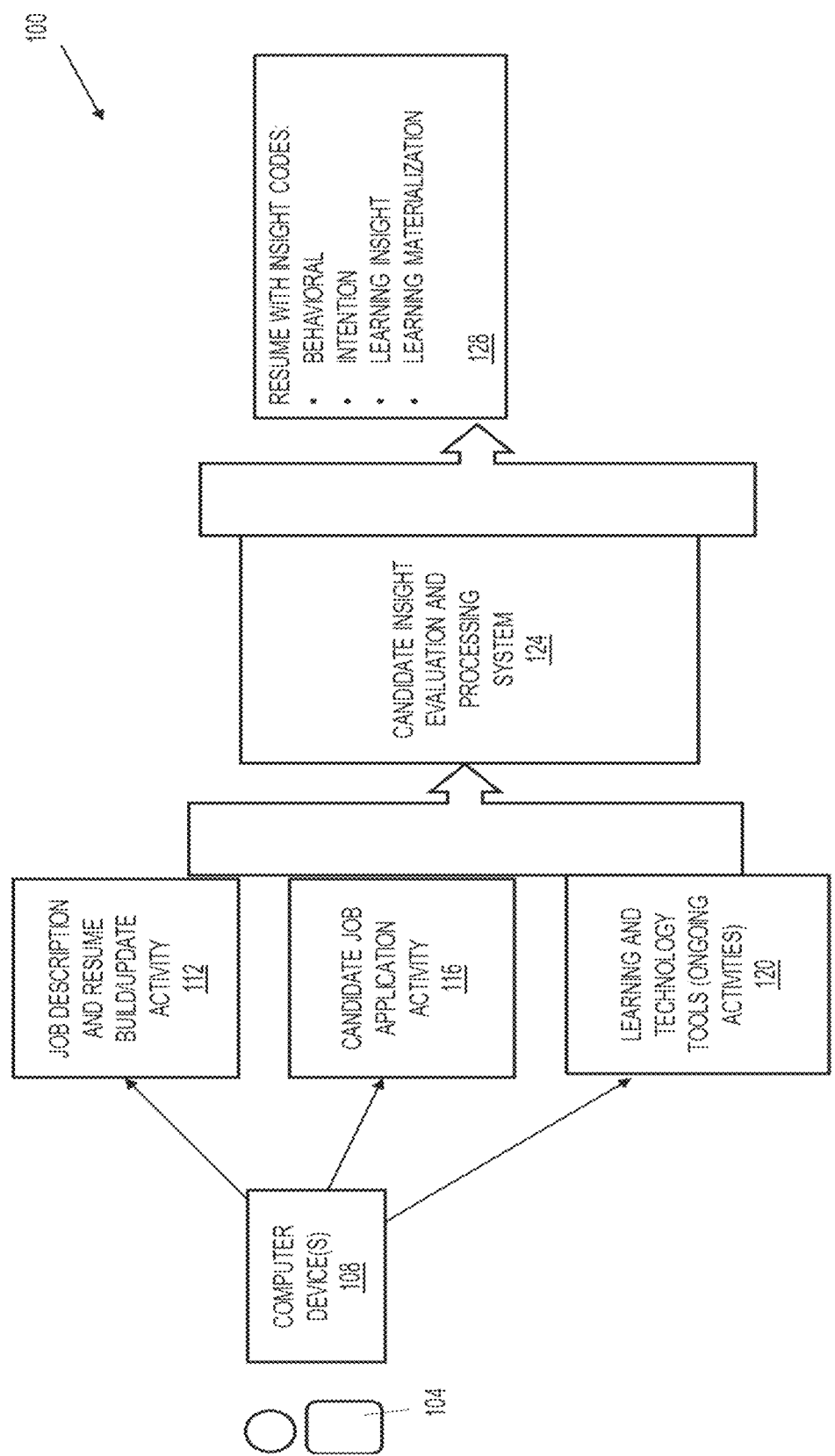
FIG. 1 illustrates an arrangement for, a computer implemented system for candidate evaluation, according to embodiments of the present invention.

FIG. 1 illustrates a computer-implemented system 100 for providing insight regarding an employment candidate 104, according to an embodiment of the present invention. (As used herein, the term "employment" is used broadly to include an engagement as an employee and an engagement as an independent contractor.) System 100 receives inputs from activity 112 performed by user 104 on device 108, e.g., inputs from user viewing or otherwise interacting with a job description on a web portal. System 100 uses existing screen gaze techniques via inputs from activity 112 to determine which part of the job description is attracting the focus of attention of user/candidate 104. For example, user 104 may be focusing his or her gaze on a "Compensation" section or "Location section" of the job description, which often provide important information for decision-making in applying for a job or accepting a job offer.

System 100 also receives input from activity 112 performed by user 104 interacting with a profile and resume builder application, e.g., inputs from user creating and editing the user's profile and resume. System 100 may compare activity 112 input from user 104 interaction with the job description to activity 112 input from activity performed by user 104 interacting with the profile and resume builder application. For example, by comparing these inputs from activity 112, system 100 may determine user 104 is editing his or her resume to recite certain locations or organizations, such as to cater to a specific hiring organization or location thereof. In another example, system 100 may determine user 104 is editing his or her resume regarding technologies or skills, which may include determining user 104 is revising the way the technologies or skills are described. In another example, system 100 may determine from activity 112 inputs that user 104 is using professional services of a consultant to fine tune to the needs and language indicated in the job description, such as for a user/candidate 104 applying for a job that is in a different country than the user's current residence.

System 100 also receives input from activity 116 performed by user 104 when user 104 interacts with a behavior finding application, which includes an application by which user 104 applies for the job indicated in the job description.

System 100 also receives input from activities 120 performed by user 104 when learning and making technical contributions, such as when using search engines, tools and etc. From activity 120 input, system 100 may determine the type and frequency of learning or technical contribution activities of user 104 and match the activities to the above described gaze analysis and resume modification insights, which can help a potential employer to evaluate candidate 104 in a better and more dynamic way. For example, system 100 may recognize types of technical contributions, which may include designing architecture using design tools, writing code using software development tools, debugging code using debuggers, etc. In another example, system 100 may classify types of learning activity as beginner, intermediate or expert categories.

Inputs from activities 112, 116 and 120 are processed by candidate insight and evaluation processing system module 124, which includes module 124 using cognitive technologies, i.e. natural language processing, unstructured data processing, visual feedback, etc. while user 104 is reading or processing the contents from devices 108 and module 124 using deep learning algorithms to create and update machine learning models, where the models build a candidate insight output 128 that includes behavior, intention and learning related metrics. In one embodiment of the present invention, module 124 embeds output 128 with the resume of candidate 104 to provide a more refined resume based on the job description and skills needed. This can inform the potential employer's decision making and interviewing process, which can reduce effort that the user 104 and potential employer spend in the hiring process and can, in turn, reduce time to hire.

Figure 2:
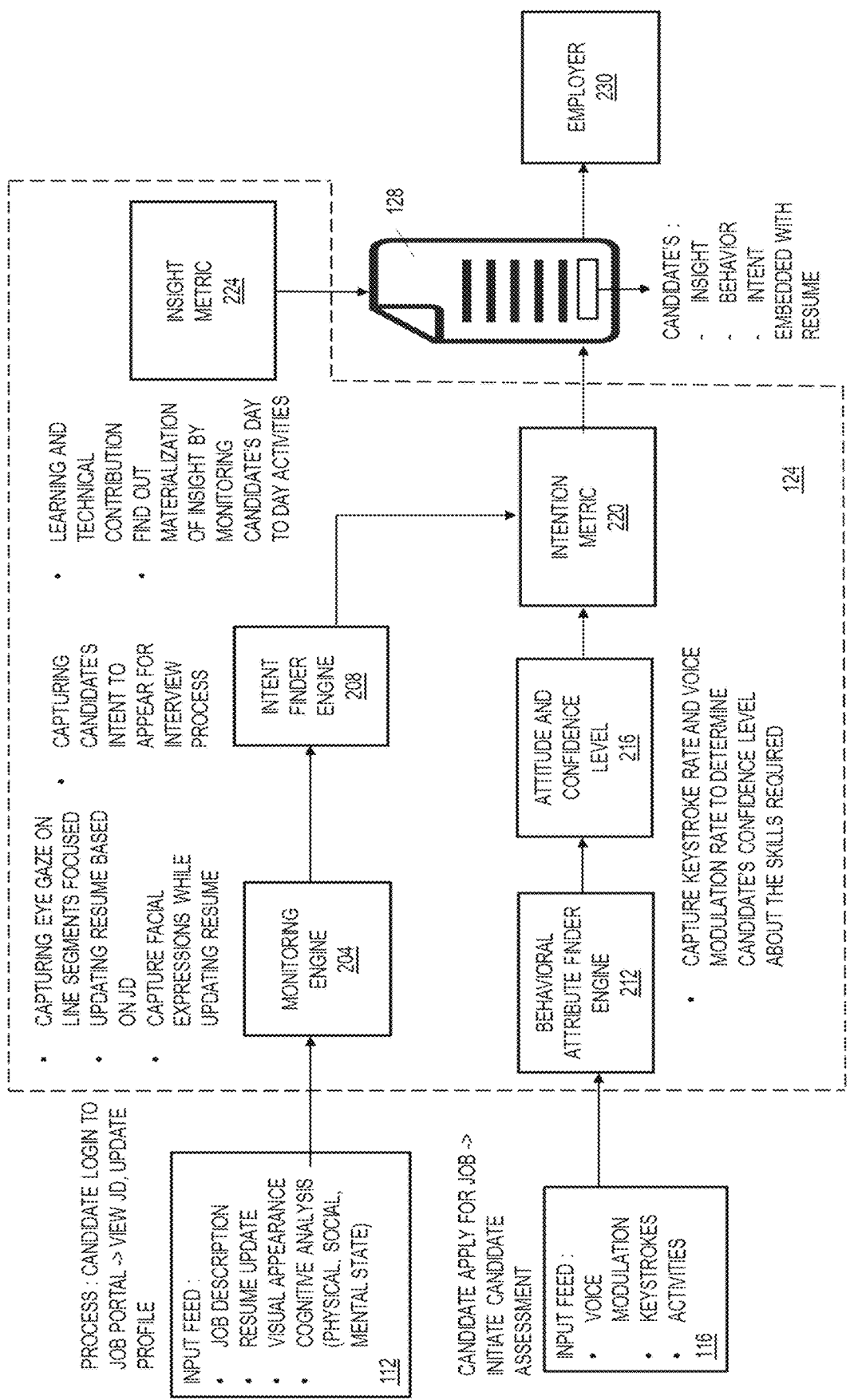
FIG. 2 illustrates aspects of candidate intent finding for the system of FIG. 1, according to embodiments of the present invention.

FIG. 2 illustrates details of the candidate insight and evaluation processing system module 124 of FIG. 1, according to an embodiment of the present invention. As shown, candidate insight and evaluation processing system module 124 receives activity 112 inputs from user 104 interacting with the profile and resume builder application and viewing the job description and inputs 116 from user 104 applying for the job. Activity 112 and 116 inputs include, in addition to the inputs described regarding FIG. 1 herein above, keystrokes of user 104 and visual appearance and sounds of user 104. For example, system 100 may detect visual appearance, including facial gesture such as angry, happy, suspicious, confused, etc. by using face expression detection technology. Sounds of user 104 may include the user's voice. Monitoring engine 204 of candidate insight and evaluation processing system module 124 may receive these activity 112 and 116 inputs and use them for cognitive analysis to determine a cognitive state of the user, e.g., mental, physical and/or social state that indicates the user's underlying intent with regard to applying for the job. Particularly where activity 112, 116 or 120 inputs are gathered by smart, mobile device(s) 108, system 100 may determine physical state based on user 104 heartbeat and other monitored condition, for example. System 100 may determine mental state by thought process analysis based on detected user 104 activities, for example. System 100 may determine social state from a user's social profiles and feeds on social connections, comments, engagements, etc. Behavioral attribute finder engine 212 and attitude and confidence level module 216 of candidate insight and evaluation processing system module 124 may receive these activity 112 and 116 inputs and use them for determining one or more behavior metric for user 104.

Figure 6:
FIG. 6 illustrates parts of the job description of FIG. 5 that the system of FIG. 1 determines the candidate is focusing on, according to an embodiment of the present invention.

In an example shown in FIG. 5 for the user's underlying intent, monitoring engine 204 receives activity 112 inputs for a job description 500 that an employer has posted on an Internet job portal, which candidate 104 is viewing, wherein engine 204 uses deep-learning, cognitive and screen gaze techniques to identify parts 604, 608 and 612 of the job description 500 Candidate 104 is focusing on, as shown in FIG. 6. Specifically, engine 204 determines candidate is focusing on location details 604, qualification details 608 and working and conditions logistics 612. Engine 204 also uses activity 112 input to determine facial expressions of candidate 104. For example, monitoring engine 204 may determine a facial expression indicates user 104 discomfort, such as confusion or fear, when user is viewing the job description. Further, monitoring engine 204 receives resume editing activity 112 inputs for activity when candidate 104 uses resume builder application to revise a part of the candidate's resume to indicate candidate 104 is willing to re-locate from Bangalore to Pune, wherein monitoring engine 204 detects from activity 112 inputs that the revision causes the resume to match the posted job description regarding location of work, whereas prior to the revision, the resume did not match the job description.

Based on the determinations made by monitoring engine 204 described above, intent finder engine 208 determines the level of interest and degree of intent of candidate 104 to appear for an employment interview regarding the job posted in the job description. More specifically, intent finder 208 computes scores as follows in the example:

Location—(Score 8/10)
    Candidate revises work location in resume
    Derived facial expression while updating resume
    Keystrokes while changing location
Qualification details—(Score 10/10, since no updates done)
Other mandate details—(Score 7/10)
    Details updated
Cumulative intent finder score—8/10

The way that intent finder engine 208 applies determinations made by monitoring engine 204 to the intent score may depend on the cognitive state of user 104 has when engaged in activities such as viewing the job description, building or updating user 104 resume, engaged in learning and making a technical contribution. In the above, for example, intent finder engine 208 may have adjusted the above intent score downward responsive to monitoring engine 204 detecting user 104 discomfort, such as via facial expression and keystroke analysis, where intent finder engine 208 determines the type or level of discomfort is inappropriate for the concurrently detected activity of user 104.

As previously mentioned, system 100 captures activity 116 inputs from user 104 applying for the job. Inputs from activity 116, as well as activity 112, are fed to behavioral attribute finder engine 212 and attitude and confidence level module 216. Responsive to user 104 applying for the job, as indicated by activity 116 inputs, engine 212 initiates questions for user 104 to answer, wherein engine 212 and module 216 determine the candidate 104 behavior metric partly in response to user 104 answers. (Engine 212 is more specific to text analysis, whereas module 216 performs audio and visual analysis, according to an embodiment of the present invention.) Analysis by engine 212 and module 216 does not focus on determining whether the answers are right or wrong, but rather on determining behavioral aspects, including how candidate 104 articulates the answers and presents them and how candid are the answers. For example, the behavioral score is increased when user 104 uses proper words with confidence, such as the most appropriate technical terms, etc. For example, the behavioral score is increased by an answer that honestly indicates candidate 104 does not know the answer, does not know the full answer, does not know the answer based on personal, hands-on experience, etc. Still further, monitoring engine 212 determines the behavior metric for candidate 104 partly in response to user 104 facial expressions and from the pace of keystrokes and the combinations of keys (delete, backspace, etc.) received in inputs from resume editing activity 112 and inputs received in inputs from activity 116 regarding answering questions in the job application process. For example, engine 212 determines a candidate 104 confidence level aspect of the behavior metric at least partly in response to how many times candidate 104 uses backspace and delete keys in answers to questions from engine 212 and in editing the resume of candidate 104 in response to candidate 104 rewording sentences of the resume to fit the job description, wherein engine 212 reduces the confidence level metric responsive to candidate 104 backspacing, deleting and rewording. Likewise, module 216 determines a candidate 104 confidence level aspect of the behavior metric at least partly in response to voice of candidate 104, including lower or higher volume and mumbling, wherein module 216 reduces the confidence level score in response to detecting mumbling and in response to detecting an overly quiet or loud voice.

In an embodiment of the present invention, engine 212 and module 216 determine the candidate 104 behavior metric at least partly via Watson Personality Insights, which is a tool in one or both of Watson Studio and Watson Machine Learning software applications commercially available from International Business Machines Corporation. ("Watson Studio" is a trademark of International Business Machines Corporation.) Watson Personality Insights identifies traits based on transactional and social media data, where the traits may include decisions, intents and behavioral traits.

Module 216 and engine 212 may also further determine attitude and confidence level by applying analytics to responses from candidate 104 with regard to questions that engine 212 presents to candidate 104 and by applying analytics to content in the profile and resume of candidate 104. More specifically, module 216 and engine 212 compute a set of scores as follows in an example:

Attitude—(Score 7/10)
    Used phrases like 'I know it partially' or 'I exactly don't know . . . but it might be something' rather than providing prompt answer Confidence Level—(Score 7/10)
    Used backspaces/delete numerous times to rephrase sentences
    While answering candidate was stammering
    Candidates voice was low at some places while answering Cumulative Behavioral Attribute Finder Score—7/10

Intention metric module 220 receives the scores computed by intent finder engine 208 and attitude and confidence level module 216 and responsively generates a combined intention score, according to one embodiment of the present invention. For the above example intent and behavior scores, module 220 generates the score by computing an average of the intent finder 208 score and the behavioral score of module 216, which in the above example=(0.7+0.7)/2=0.7.

In another embodiment, intention metric module 220 computes a weighted average intention score, which applies weights to the intent and behavior aspects responsive to the job description. For example, where a job description emphasizes that an employment candidate 104 needs good negotiation and communication skills for the job, module 220 recognizes that the emphasis is a behavioral attribute, so that module 220 generates a weighted average score in which the behavior score of module 216 is weighted more than the intent score of module 208, such as, for example, ((intent score×0.35)+(behavior score×0.65))/2. Alternatively, where a job description emphasizes technical aspects, e.g., Java programing with AI/ML, then module 220 generates a weighted average score in which the intent score of module 208—and specifically the intent metric that captured candidate 104 changes to the resume—is weighted more than behavior score of module 216.

Intention metric module 220 also receives the completed resume and job application from user activity 112 and 116 inputs. Upon generating the combined metric, intention metric module 220 embeds the metric in the resume, profile or employment application and sends them to the employer via an electronic network. In another embodiment, intention metric module 220 does not combine scores from intent finder engine 208 and attitude and confidence level module 216, but rather embeds and sends the individual scores in the resume, profile or employment application.

In one embodiment of the present invention, candidate insight and evaluation processing system module 124 stores metrics generated by module 124 for candidates 104 who have used system 100 for a particular job description and generates a list of profiles ranked according to one or more of the metrics. For example, by ranking profiles according to the metric of intent finder 208, the ranking makes it easy for the potential employer to select candidates with highest intentions to complete an interview process, which may include attending a live interview on-line or in-person.

The following Table 1 provides further examples of outputs of the modules and activities shown in FIG. 2, according to an instance of an embodiment of the present invention.

TABLE 1

Output 112 :- Input feed
```
{
  "company": "Pied Piper",
  "url": "http://piedpiper.com/",
  "remoteFriendly": true,
  "market": "SaaS",
  "size": "10-50",
  "jobs": [
    {
      "position": "Software Engineer",
      "title": "Backend Developer",
      "description": "You will help us build API for our compression infrastructure.",
      "url": "http://piedpiper.com/jobs/backend-developer",
      "type": "full-time",
      "posted": "2019-01-20",
      "location": "US",
      "skills": ["Java", "Javascript"],
      "salaryRange": {
        "from": 90000,
        "to": 100000,
        "currency": "USD"
      },
      "equity": {
        "from": 0.005,
        "to": 0.01
      },
      "perks": ["free food", "gym membership"],
      "apply": "http://piedpiper.com/jobs/backend-developer/apply"
    }
  ],
  "Resume sections": {
    [
      "Personal Information",
      "skills",
      "experience",
      "projects",
      "acreditions"
    ]
  },
  "resume modification": {
    [
      "modified" : "yes",
      "Modified content" : {
        [
          "section" : "Skills",
          "name" : "Programming languages",
          "keywords" : "Angular.JS"
        ]
      }
    }
  }
  "Cognitive Parameter" : {
    "Expression ": "Smile",
```

TABLE 1-continued

```
            "Emotion" : "Happy",
            "Intensity" : "Strong"
        }
}
Output 116
{
        "candidate assessment data" : {
            "voice modulation" : {
                "pitch level" : "high",
                "stammering" : "no"
            },
            "keystrokes" : {
                [
                {
                    "key" : "backspace",
                    "frequency used" : "medium"
                },
                {
                    "key" : "del",
                    "frequency used" : "low"
                }
                ]
            }
}
Output 204 - Monitoring Engine
{
        "facial expressions" : "happy",
        "resume update" : "yes",
        "job description screening" : "yes",
        "visually gazed area on job description" : {
            [
                "required skills"
            ]
        },
        "resume updated section" : {
            [
                "Skills"
            ]
        }
}
Output 208 - Intent Finder Engine
{
        "Intent score" : "80%",
        "Description" : "Intent to appear for next screening process"
}
Output 212 - Behavioral Attribute Finder Engine
{
        "Personaility" : [
            {
                "name": "Agreeableness",
                "percentile": "80%"
            },
            {
                "name": "Openness",
                "percentile": "80%"
            },
            {
                "name": "Introversion/Extroversion",
                "percentile": "50%"
            },
            {
                "name": "Conscientiousness",
                "percentile": "50%"
            },
            {
                "name": "Neuroticism",
                "percentile": "5%"
            }
        ]
}
Output 216 - Attitude and Confidence Level
{
        "Attitude Score" : "70%",
        "Confidence Score" : "80%"
}
Output 220 - Intention Metric
{
        "Potential candidate" : "Yes",
        "Personality Traits Score" : "70%"
}
```

TABLE 1-continued

```
Output 224 - Insight Metric
{
    [
        {
            "Subject Matter": "Java",
            "Level": "Expert"
            "Insight Score": "70%"
        },
        {
            "Subject Matter": "AngularJS",
            "Level": "Beginner"
            "Insight Score": "60%"
        },
        {
            "Subject Matter": "HTML",
            "Level": "Intermediate"
            "Insight Score": "70%"
        }
    ]
}
```

Output of 220 and 224 is included in 128 report

Figure 3:
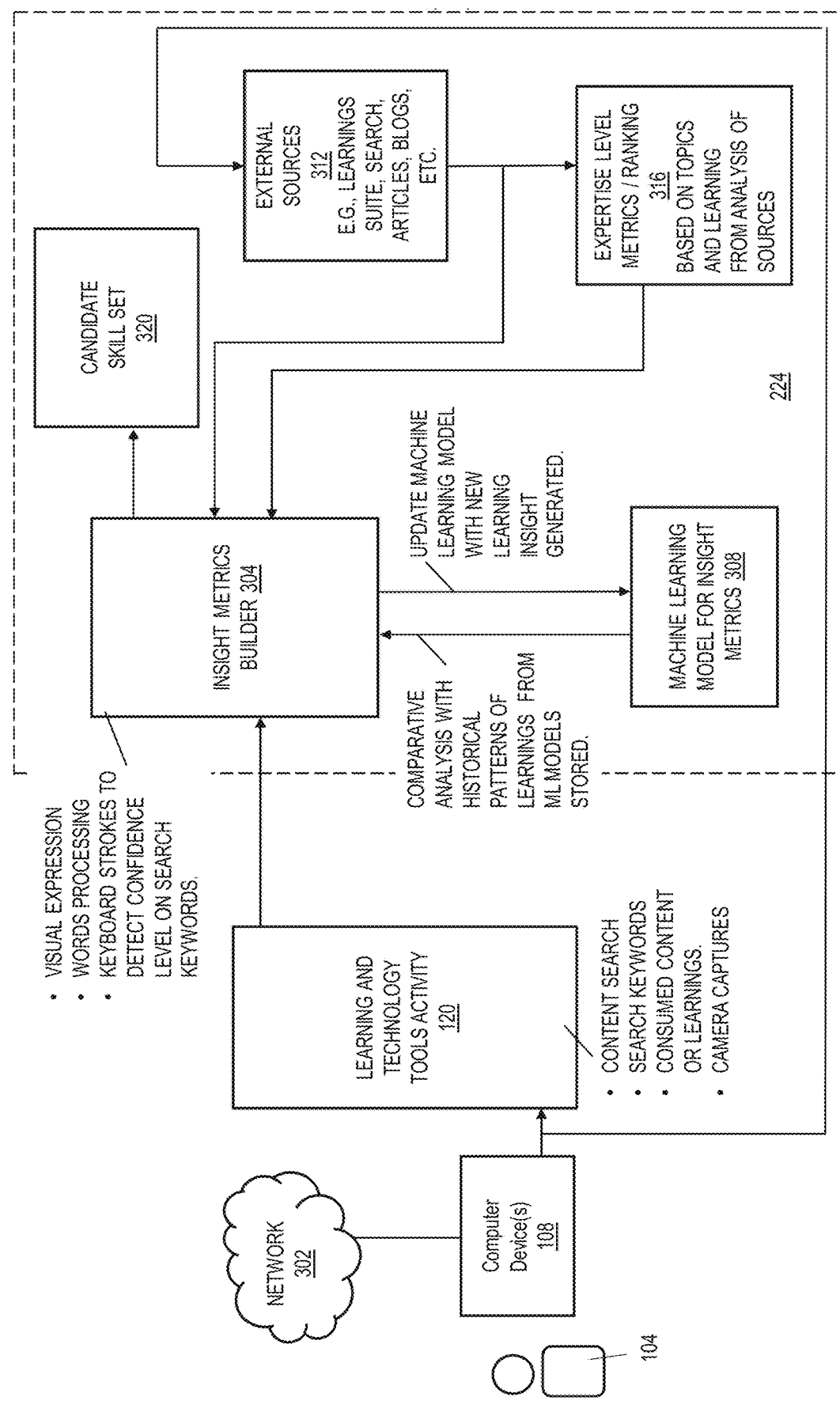
FIG. 3 illustrates, for the system of FIG. 1, aspects of generating metrics regarding candidate evaluation, according to embodiments of the present invention.

FIG. 3 illustrates additional aspects of insight metrics engine 224, which includes expertise level metrics module 316 that tracks search results 312 over time, which is content that candidate 104 receives on computer device(s) 108 via network 302 (intranet and Internet), including technical articles, research articles and technical blogs. Module 316 analyzes received results 312 to determine expertise level and experience level of candidate 104 based on content of results 312, including topics, topic levels and degree of difficulty and taking into account changes over time in the topics, topic levels and degree of difficulty of results 312 received by candidate 104. In an example, expertise level determined by module 316 may include levels like beginner, intermediate, expert, junior, senior, etc. In an example, experience level determined by module 316 may include levels like intern, entry, associate, mid, director, executive, etc. Insight metrics engine 224 also includes insight metrics builder module 304 that receives expertise level and experience level from module 316. For its own purpose, builder module 304 also tracks results 312 received over time by candidate 104. Further, builder module 304 tracks search queries to network 302 generated by candidate 104 on computer device(s) 108. The search queries—including words, phrases and sentences thereof, which monitoring system 120 captures and communicates to module 304—cause computer device(s) 108 to fetch results 312.

Builder module 304 provides the information it receives to model 308, which generates user 104 metrics that indicate skill set and functional/domain knowledge gathered by user 104, according to an embodiment of the present invention. In an example, skill set metric may include Java, C++, Hibernate, Spring boot, Microservices Architecture, Architect, etc. In an example, functional/domain knowledge metric may include Real time collaboration, Enterprise Asset Management, Talent Management Solution, etc. Model 308 generates the metrics by applying analytics, deep-learning and cognitive-learning based on content 312 that user 104 consumes over time and on input captured by monitoring system 120 from user 104 activity on computer device(s) 108, including technical contributions, as previously described. More specifically, model 308 applies deep-learning to the expertise level determined by and received by builder 304 from module 316 and also applies the deep-learning to the information passed to it by module 304, including job description, candidate's resume and profile, technical contributions and queries from learning and tool activity 120 monitoring (including words, phrases and sentences used in the queries), where deep-learning model 308 determines relevance of content 312 and technical contributions to the job description and to the candidate's profile (skill, experience, project work, credits, etc.) and resume. In one aspect, model 308 determines a metric referred to herein as an "accuracy level" metric that indicates how precisely candidate 104 puts together words and phrases in search queries and technical contributions to produce relevant results on subjects including those indicated in the job description.

Further, based at least on the technical contributions, queries, query results 312 and relevance provided to it by builder 304, including changes in these parameters over time, the deep-learning by model 308 determines indications of candidate 104 insight regarding respective technical areas and topics of the job description, profile and resume, where the insight indication identifies whether candidate 104 is refreshing an existing skill, learning additional expertise on an existing skill or learning a new skill. When the insight indication identifies that candidate 104 is learning new skills or additional expertise on existing skills, the insight indication also identifies a degree of learning and how quickly the candidate is learning.

Based on the relevance and insight indication determined by model 308, module 304 builds a set of insight metrics for candidate 104, which are useful to the potential employer in the recruitment process. These include a metric referred to herein as a "percentage insight" metric, which indicates how well the skills of the candidate fit the job description.

In one example, module 304 determines that the profile of candidate 104 indicates candidate is a "Cloud Native Developer Pro+." Module 304 classifies content 312 that candidate 104 consumes over a predetermined time interval and compares the classification to the profile description. In this example instance, module 304 classifies content 312 as cloud design patterns and architecture related content. Based on the comparison, module 304 determines that during the interval candidate 104 has engaged in enhancing his/her expertise in cloud architecture. In another instance, module 304 classifies content 312 consumed over an interval as data science related content. By comparison to candidate's profile, which does not mention data science skills, module 304 determines that the data science related content indicates candidate 104 has engaged in acquiring new skills. In a further aspect, module 304 outputs its results, including candidate 104 skill set and the metrics it computes, to repository 320.

The following Table 2 provides further examples of outputs of the modules and activities shown in FIG. 3, according to an instance of an embodiment of the present invention.

TABLE 2

Output 120 - Monitoring System
{
  "Search Keyword": {"Java"},
  "Auto-Suggest Used": "Yes",
    "Learnings" : {
       "sources" : {
          [
             "Blogs","Articles"
          ]
       },
       "content" : {
          [
             {
                "type": "video", TABLE 2-continued "level": "intermediate",
                "subject matter": "Java Spring",
                "engagement score": "80%"
             },
             {
                "type": "text",
                "level": "beginner",
                "subject matter": "AngularJs",
                "engagement score": "60%"
             }
          ]
       }
    }
}
Output 304 - Insight Metrics Builder
Insight Metric builder produces "Candidate Skill Set". Please refer to JSON object of Fig.2-320
Output 312 - External sources
{
    [
       "learnings",
       "articles",
       "blogs",
       "scholarly articles",
       "books",
       "Live-streams",
       "audio-podcast"
    ]
}
Output 316 - Expertise level metrics / ranking
{
    [
       {
          Topic: "Advanced Java",
          Sub-topic: "Networking",
          Learning source: "Live-stream",
          Content Quality: "High",
          Ranking/Score: "4.5*"
       },
       {
          Topic: "Management Skills",
          Sub-topic: "Leadership",
          Learning source: "Articles",
          Content Quality: "Good",
          Ranking/Score: "4"
       },
       {
          Topic: "Quantum Computing",
          Sub-topic: "Research",
          Learning source: "scholarly articles",
          Content Quality: "Good",
          Ranking/Score: "4.5*"
       }
    ]
}
Output 320 : Candidate Skill Set Repository
{
    Skills : {
    "type": "Programming Languages",
       "items": [
             Course : "Java",
             Level : "Intermediate",
          Insight Score : "80%"
          ],
          [
             Course : "Javascript",
             Level : "Beginner",
          Insight Score : "50%"
          ],
          [
             Course : "Ruby",
             Level : "Intermediate",
          Insight Score : "70%"
          ]
    },
    {
    "type": "Web Frameworks",
       "items": [
             Course : "Apache",
             Level : "Intermediate", TABLE 2-continued

```
        Insight Score : "80%"
        ],
        [
            Course : "Sinatra",
            Level : "Beginner",
        Insight Score : "40%"
        ]
    },
    {
        "type": "Databases",
        "items": [
            Course : "MySQL",
            Level : "Average",
        Insight Score : "50%"
        ],
        [
            Course : "IBM DB2",
            Level : "Intermediate",
        Insight Score : "70%"
        ],
    },
    Learnings : {
        [
            Source : "LiveStreams",
            Preferred : "Most"
        ],
        [
            Source : "Blogs",
            Preferred : "Yes"
        ],
        [
            Source : "Articles",
            Preferred : "Least"
        ]
    },
    Candidate's Expertise Level : {
        Level : "Average",
        Insight Score : "80%"
    }
}
```

Figure 4:
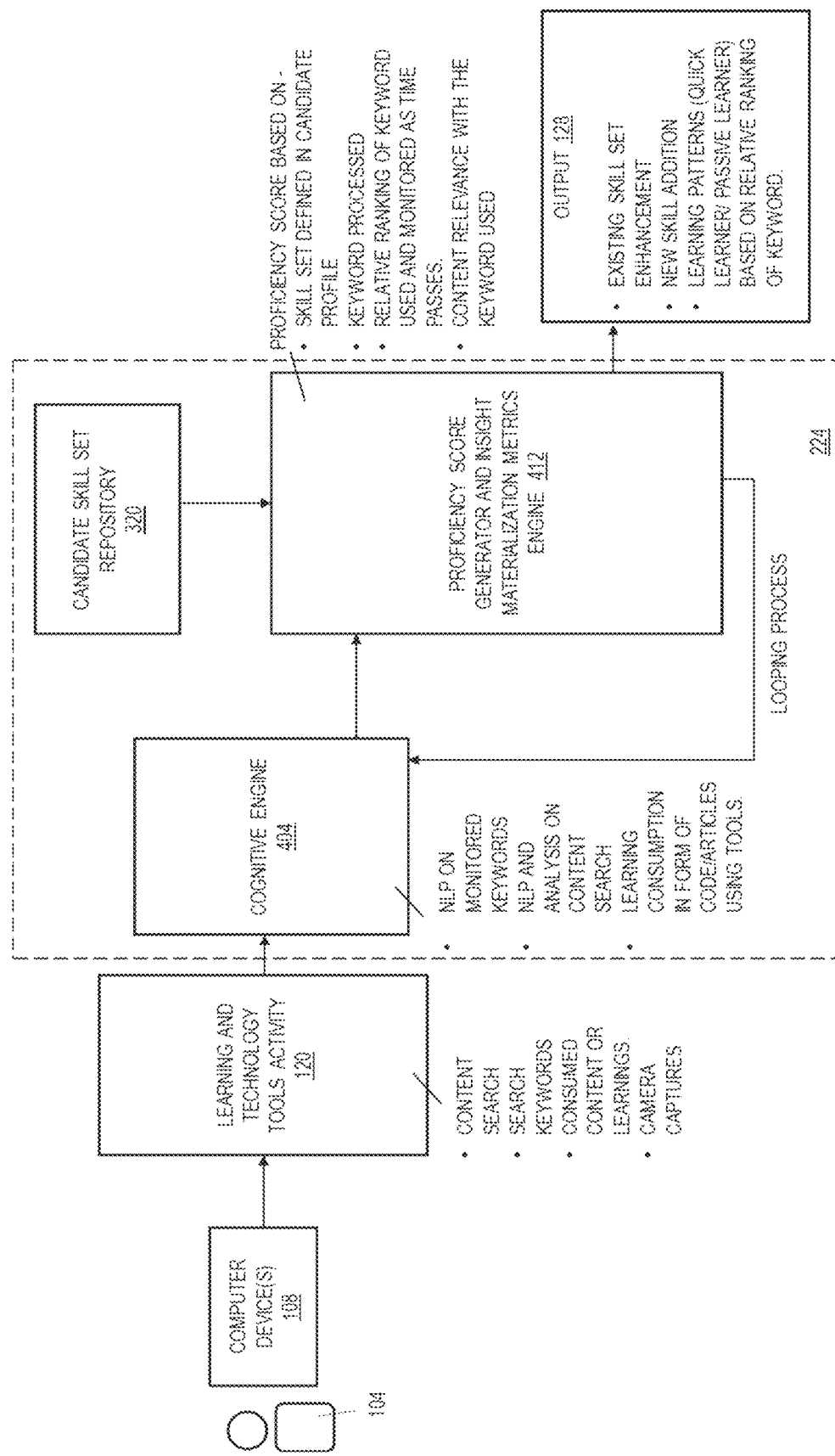
FIG. 4 illustrates aspects of determining a candidate's materialization of insight, according to an embodiment of the present invention.

FIG. 4 illustrates additional aspects of insight metrics engine 224, which provides insight materialization service via cognitive engine 404 and proficiency score generator and insight materialization metrics engine 412, according to an embodiment of the present invention. Regarding insight that candidate 104 has gathered, this service determines how much of the insight is practically materialized by applying analytics and cognitive services on the day-day activities candidate 104 performs and by matching those against insight metrics. More specifically, system 124 monitors each activity 120 user 104 performs day-to-day, and cognitive engine 404 applies analytics on gathered data to derive concept, subject, content, level of content, etc. Module 412 determines how much of what candidate 104 has gathered on various subject matter is actually materialized and at what level by comparing results previously described processing with results 320 returned by Insight Metric Builder system.

In one example:
Insight metric builder 304 determines: {SubjectMatter='Data Science', SubjectMatterInsightLevel='Beginner', SubjectMatterSearchHistory='2 week', CandidateExperience="5 years"}
Monitoring history of day-to-day activities for a defined period (e.g., two weeks), cognitive engines 404 and 412 determine that in the past week candidate has applied concept/subject matter Data Science using Data Stage Tools, Python scripting, etc.
Both FIG. 3 and FIG. 4 aspects of insight metrics engine 224 provide output 128 to profile for candidate 104 which in turn helps recruitment system to find best matches for job profile and to find potential candidates, which is a win-win situation for both potential employer and candidate.

The intention-related metrics provided by module 220 of FIG. 2 (and its related modules 204, 208, 212 and 216), on the one hand, and the insight metrics provided by module builder 304 of FIG. 3 (and its related modules 308 and 316) and engines 404 and 412 of FIG. 4, on the other hand, are independent services helpful for evaluating a candidate either using intent finder and insight evaluation metrics. These two services are different and can be used and integrated into a human capital management or talent management system domain to generate insight from different activities done by candidates at different levels.

The following Table 3 provides further examples of outputs of the modules and activities shown in FIG. 4, according to an instance of an embodiment of the present invention.

TABLE 3

```
Output 120 - Monitoring System
{
    "Search Keyword": {},
    "Auto-Suggest Used": "Yes",
    "Learnings" : {
        "sources" : {
            [
                "Blogs","Articles"
            ]
        },
        "content" : {
            [
                {
                    "type": "video",
                    "level": "intermediate",
                    "subject matter": "Java Spring",
                    "engagement score": "80%"
                },
                {
                    "type": "text",
                    "level": "beginner",
                    "subject matter": "AngularJs",
                    "engagement score": "60%"
                }
            ]
        }
    }
}
Output 320 : Candidate Skill Set Repository
{
    Skills : {
    "type": "Programming Languages",
        "items": [
                Course : "Java",
                Level : "Intermediate",
            Insight Score : "80%"
            ],
            [
                Course : "Javascript",
                Level : "Beginner",
            Insight Score : "50%"
            ],
            [
                Course: "Ruby",
                Level : "Intermediate",
            Insight Score : "70%"
            ]
    },
    {
    "type": "Web Frameworks",
        "items": [
                Course : "Apache",
                Level : "Intermediate",
            Insight Score : "80%"
            ],
```

TABLE 3-continued

```
        [
                Course : "Sinatra",
                Level : "Beginner",
        Insight Score : "40%"
        ]
},
{
"type": "Databases",
    "items": [
                Course : "MySQL",
                Level : "Average",
        Insight Score : "50%"
        ],
        [
                Course : "IBM DB2",
                Level : "Intermediate",
        Insight Score : "70%"
        ],
    },
    Learnings : {
        [
                Source : "LiveStreams",
                Preferred : "Most"
        ],
        [
                Source : "Blogs",
                Preferred : "Yes"
        ],
        [
                Source : "Articles",
                Preferred : "Least"
        ]
    },
    Candidate's Expertise Level : {
        Level : "Average",
        Insight Score : "80%"
    }
}
Output 412 / 404 (Combined Output) - Proficiency Score Generator
and Insight Materialization Metrics Engine and Cognitive Engine
{
    "materialization metric" : {
        [
                "skill mentioned" : "Core Java",
                "Adopted in day-to-day activities" : "Yes",
                "level" : "Average",
                "proficiency score": "75%"
        ],
        [
                "skill mentioned" : "JavaScript",
                "Adopted in day-to-day activities" : "Yes",
                "level" : "Intermediate",
                "proficiency score": "50%"
        ]
    }
}
Included in report 128
    {
        Existing skills: {
            [
                Course : "Java",
                Level : "Expert",
                Adopted in day-to-day activities : "Yes",
                Timeline : "9 months",
            "Insight Score": "70%"
            ],
            [
                Course : "AngularJS",
                Level : "Beginner",
                Adopted in day-to-day activities : "Yes",
                Timeline : "6 months",
            "Insight Score": "60%"
            ],
            [
                Course : "Ruby",
                Level : "Intermediate",
                Adopted in day-to-day activities : "Yes",
                Timeline : "2 months",
            "Insight Score": "60%"
            ],
```

TABLE 3-continued

```
        },
        New Learnings : {
            [
                Course : "Spring Boot",
                Level : "Intermediate",
                Adopted in day-to-day activities : "Yes",
                Timeline : "2 months",
            "Insight Score": "70%"
            ],
            [
                Course : "Python",
                Level : "Beginner",
                Adopted in day-to-day activities : "No",
                Timeline: "NA",
            "Insight Score": "50%"
            ],
        },
        Content Searched : {
                Level : "Intermediate"
        },
        Candidate Skills Adoption Level : "Quick Learner"
}
```

Figure 11:
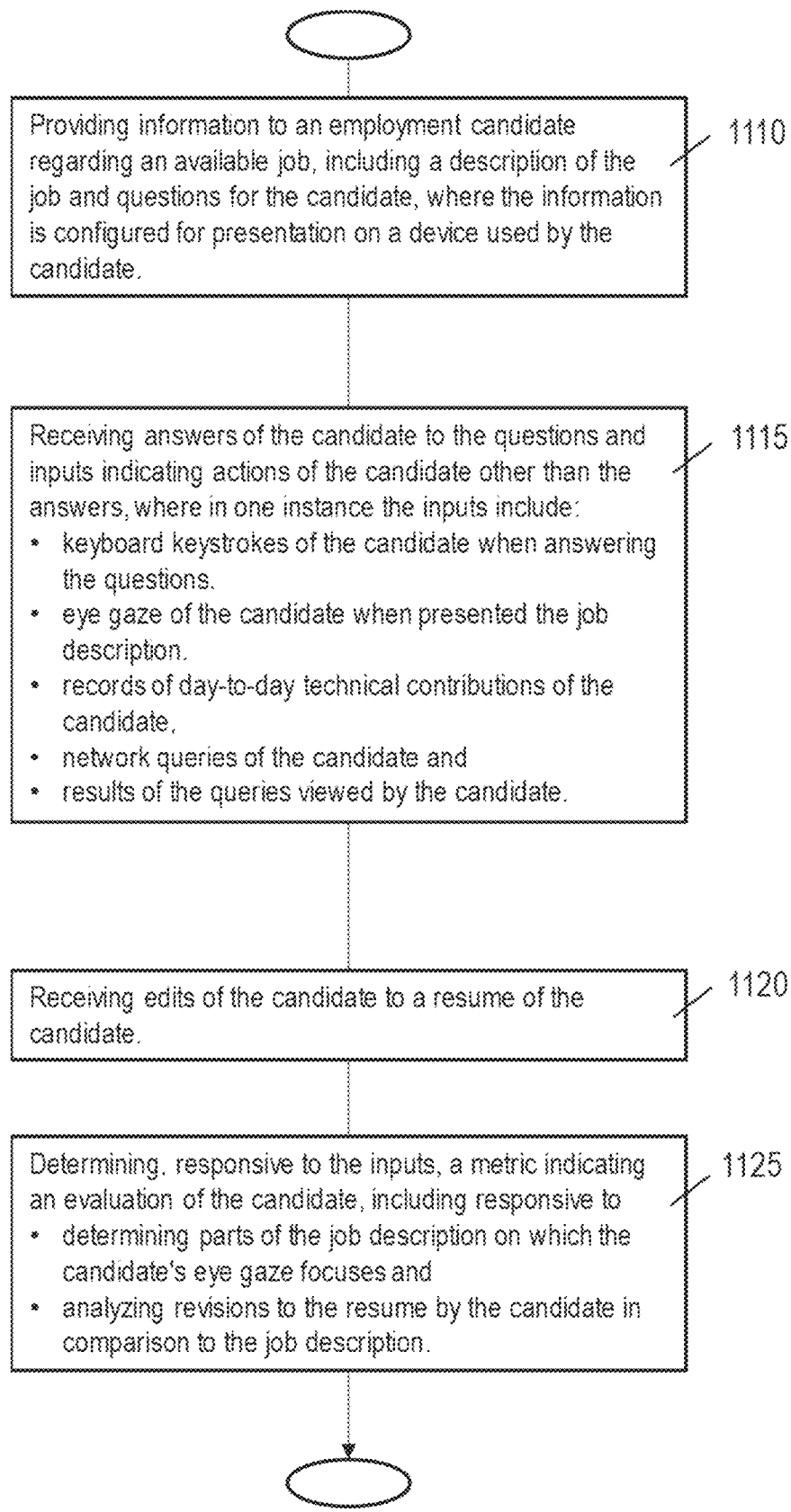
FIG. 11 illustrates aspects of a method performed by the system of FIGS. 1 through 4, according to an embodiment of the present invention.

Referring now to FIG. 11, aspects of a method performed by the system of FIGS. 1 through 4, are illustrated according to an embodiment of the present invention. The method in this embodiment includes providing 1110, by a computer system via a network, information to an employment candidate regarding an available job, including a description of the job and questions for the candidate, wherein the information is configured for presentation on a device used by the candidate. The method in this embodiment also includes receiving 1115, from the device by the computer system via the network and in response to the information being presented to the candidate, answers of the candidate and inputs indicating actions of the candidate other than the answers, where the inputs include:

keyboard keystrokes of the candidate when answering the questions, eye gaze of the candidate when presented the job description, records of day-to-day technical contributions of the candidate, network queries of the candidate, and results of the queries viewed by the candidate.

The method in this embodiment also includes receiving 1120, by the computer system via the network, edits of the candidate to a resume of the candidate and determining 1125, by the computer system responsive to the inputs, a metric indicating an evaluation of the candidate, including responsive to determining parts of the job description on which the candidate's eye gaze focuses and analyzing revisions to the resume by the candidate in comparison to the job description.

This disclosure describes application of deep learning techniques and analysis of user cognitive attributes. There are many ways to know user behavior today. Knowing user behavior may include, for example, predicting online user behavior. System 100 in embodiments of the present invention, for example, may gather statistics about which UI element a user 104 clicks/taps most often in an application, which are clicked/tapped least often, and then rearranges a UI to make the interaction with those UI elements easier. If an application is based on user interaction, the application can enhance the user-experience by keeping track of which other user are frequent contacts. Techniques applied are dependent on what habits at to be captured and what services are to be optimized.

For training and testing, according to an embodiment of the present invention, system 100 captures observations for candidates 104, i.e., data as indicated for the front end, i.e., inputs from activities 112, 116 and 120 in FIGS. 1 and 2 and sources 312 in FIG. For the training and test observations, humans manually generate metrics like the outputs 128 system 100 will automatically generate once system 100 is trained. The training observations and corresponding, manually generated metrics are fed as training data into system 100 in a training mode to generate model parameters. Once trained, the test observations are fed as test data into system 100 in an operating mode to produce machine-generated metrics, which are compared to the corresponding, manually-generated metrics of the test data, for evaluating how well system has been trained with the training data set. Note that for training data, all captured attributes of candidate 104 can be considered. Historical data of the potential employer may also be considered, because accuracy of system 100 will increase with more training data.

Machine Learning includes a vast set of tools. System 100, in one embodiment of the present invention, uses a Bayesian classifier model. However, this approach needs a large dataset. In one embodiment of the present invention, system 100 employs user modelling, wherein observations of the user's behavior and behavior changes provide training data for a model that predicts user behavior. Note also that a data set containing the activity attribute details of the user can also be used for reinforcement technique.

In an embodiment of the present invention, "AutoAI," is used for creating, training, and deploying a machine learning model. (AutoAI is a tool in one or both of Watson Studio and Watson Machine Learning software applications commercially available from International Business Machines Corporation.) AutoAI generates customized candidate model pipelines over time by analyzing the data described herein and discovering the transformations, algorithms, and parameter settings that work best for the given data.

In an embodiment of the present invention, modules 304 and 308 of FIG. 3 provide a learning model, wherein the model of 304 and 308 is created and trained based on attributes including those shown for inputs 112 and 116 in FIG. 2. In one alternative, the model of 304 and 308 is trained via semi-supervised learning, wherein not all activities done by users (including inputs 112 and 116) are labeled but some data is labeled, i.e., classified, for the captured activities. The classified labels are used to model 304/308 with a result set defined as insight score, intent score, materialization score. For example, skills attributes, behavioral attributes and related data is fed to machine learning model 304/308 with historical data indicating sample candidate selections and rejections by employers 230 (FIG. 2). This provides the AutoAI analysis that AutoAI uses to determine whether an out of sample candidate is a potential hire or not.

In another embodiment of the present invention, model 304/308 performs analysis on un-labeled sample data to generate predictions for out of sample data. For example, where a hiring organization has set a threshold limit or range for overall intent as 40%-70%, when model 304/308 is trained with sample data, it is set to deem a candidate as a potential hire based on a skills score of 60-70% and a behavioral score of 50-60%. Then, model 304/308 later may use additional sample data of hired candidates and apply semi-supervised learning on this data. For example, for additional sample data in the semi-supervised training mode, model 304/308 may determine that a candidate with a 40-50% skills score but good behavioral score 70-90% was hired. In response to the additional training such as this, model 304/308 may revise thresholds for predictions.

Figure 7:
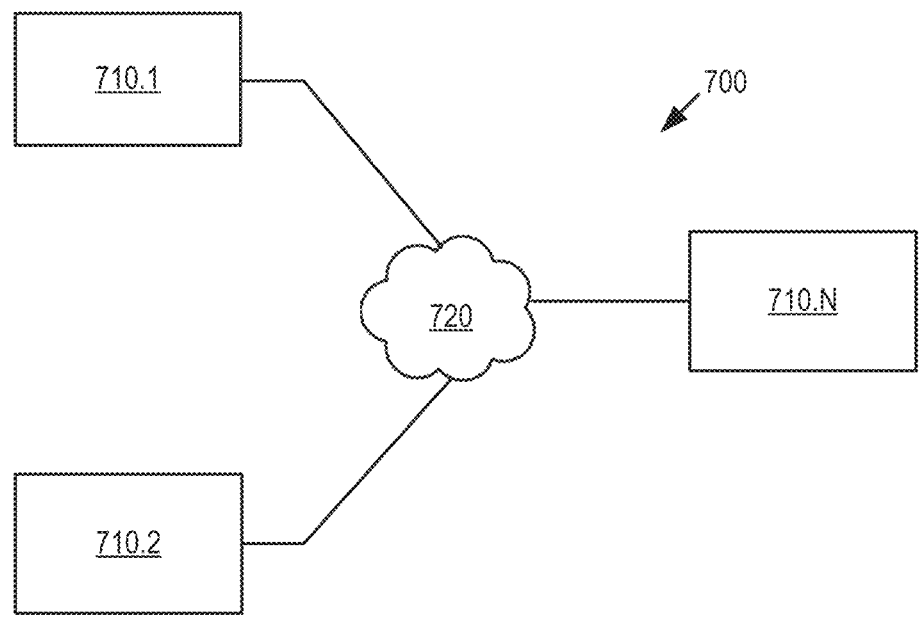
FIG. 7 illustrates a networked computer environment, according to embodiments of the present invention.

FIG. 7 illustrates an example computing environment 800, according to embodiments of the present invention. As shown, computing environment 800 includes computer systems 710.1, 710.2 through 710.N connects via network 820, which may be a public or private network. Computer device (s) 108 shown in FIG. 1, for example, may be implemented as one or more of systems 710.1, 710.2, etc., in an embodiment of the present invention. Systems 710.1, 710.2, etc. include modules, which may be program or hardware modules, configured to perform tasks for their own respective systems or for other systems or both, including tasks as described for elements 112, 116 120 and 124 of FIGS. 1 through 4.

Figure 8:
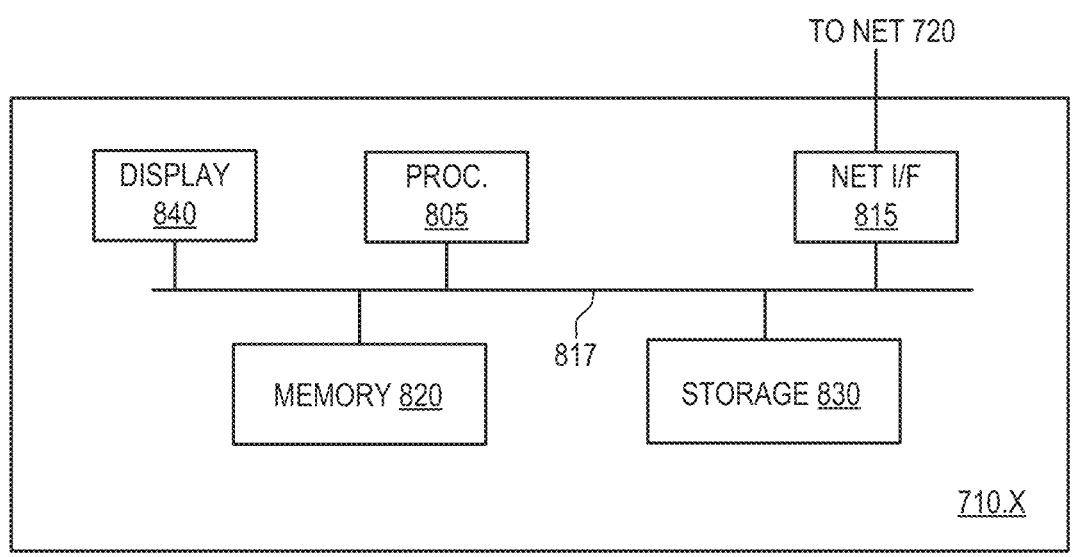
FIG. 8 is a block diagram of devices shown in FIG. 7, according to embodiments of the present invention.
Figure 9:
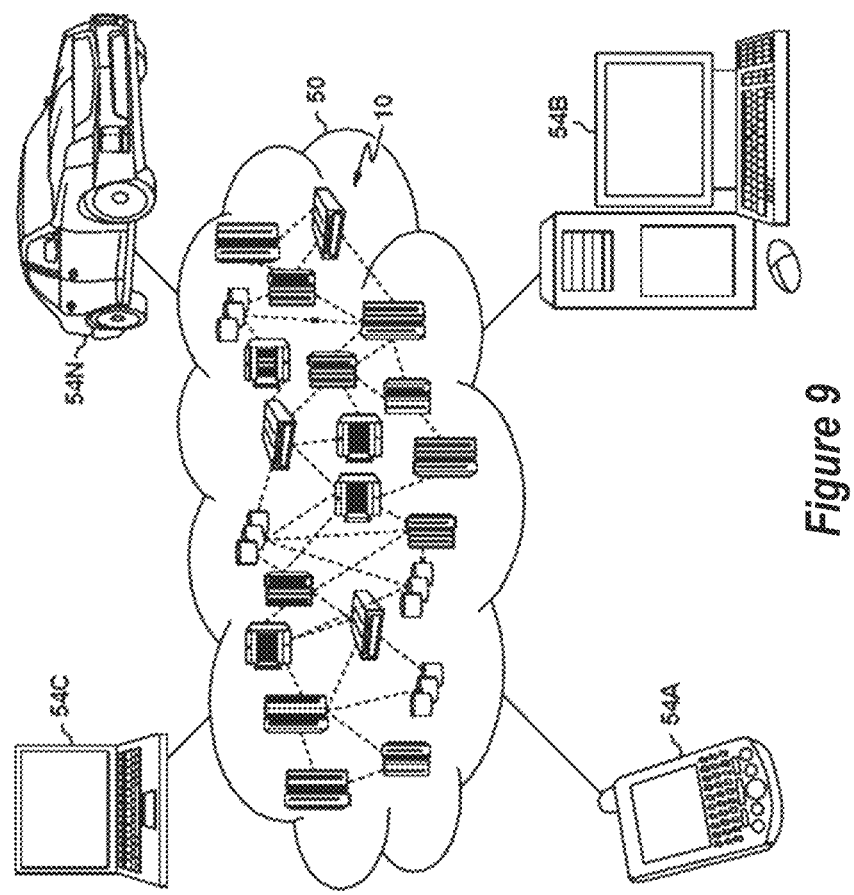
FIG. 9 depicts a cloud type of computing resource environment, according to embodiments of the present invention.
Figure 10:
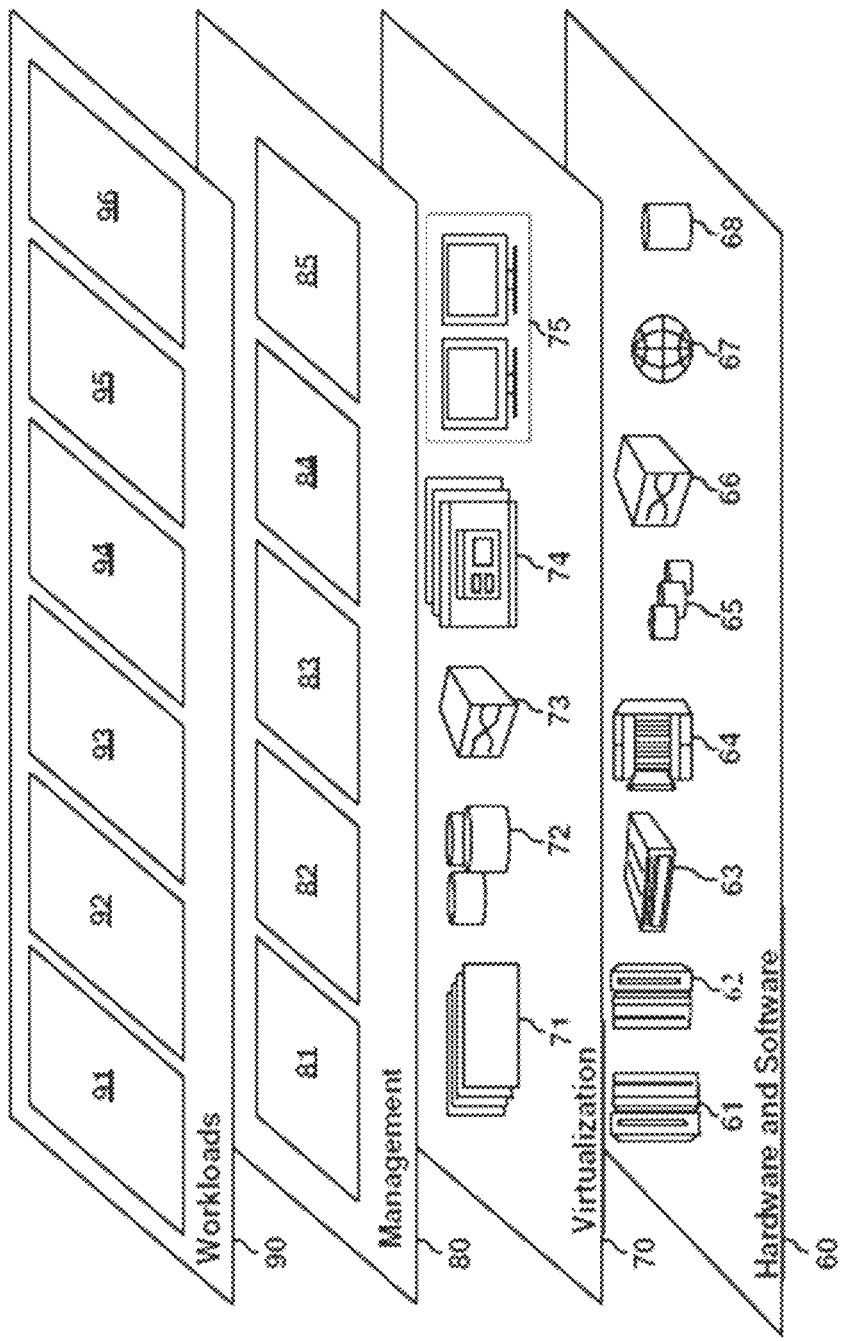
FIG. 10 depicts abstraction model layers applicable to a cloud type of computing resource model, according to embodiments of the present invention.

FIG. 8 illustrates details of a computer system 810.X suitable as computer systems 710.1, 710.2, etc. according to embodiments of the present invention, wherein system 810.X includes at least one central processing unit (CPU) 805, network interface 815, interconnect (i.e., bus) 817, memory 820, storage device 830 and display 840 where system 810.X may include an icon management module 860. CPU 805 may retrieve and execute programming instructions stored in memory 820 for applications, including module 860. Similarly, CPU 805 may retrieve and store application data residing in memory 820. Interconnect 817 may facilitate transmission, such as of programming instructions and application data, among CPU 805, storage 830, network interface 815, and memory 820. CPU 805 is representative of a single CPU, multiple CPUs, a single CPU having multiple processing cores, and the like. Additionally, memory 820 is representative of a random access memory, which includes data and program modules for run-time execution. It should be understood that system 810.X may be implemented by other hardware and that one or more modules thereof may be firmware.

In FIG. 1, activities 112, 116 and 120 are shown between computer device(s) 108 and computer system implemented module 124 because all or part of each of them may be performed in device(s) 108, which may be local to and under control of user 108, or may be performed in module 124, which may be remote from user 108 or local to user 108, even to the extent of being implemented in device(s) 108. Still further, all or part of each of device(s) 108 and module 124 may be performed in a cloud computing implementation in which most aspects thereof are remote from user 108.

It is to be understood that although this disclosure includes the following detailed description of cloud computing, implementation of the teachings recited herein are not limited to a cloud computing environment. Rather, embodiments of the present invention are capable of being implemented in conjunction with any other type of computing environment now known or later developed.

A cloud computing model of service delivery may include at least five characteristics, at least three service models, and at least four deployment models.

Characteristics for a cloud computing model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models for cloud computing are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud computing are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling computing resources.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91, software development and lifecycle management 92, virtual classroom education delivery 93, data analytics processing 94, transaction processing 95, and providing computing resources to a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer system implemented method for determining at least one metric for an employment candidate, comprising:
 providing to an employment candidate, by a computer system via a network, information regarding an available job, wherein the information includes a description of the job and questions for the candidate and wherein the information is configured for presentation on a device used by the candidate;
 receiving, from the device by the computer system via the network and in response to the information being presented to the candidate, answers of the candidate and inputs indicating actions of the candidate other than the answers, wherein the inputs include eye gaze of the candidate when the candidate is presented the job description and revisions made by the candidate to the candidate's resume; and determining a metric by the computer system responsive to the answers and the inputs, wherein the determining the metric comprises:
- determining parts of the job description on which the candidate's eye gaze focuses;
- comparing revisions to the resume by the candidate to the job description parts on which the candidate's eye gaze focuses;
- determining in response to the comparing that the candidate revised one of the parts of the resume to match one of the parts of the job description on which the candidate's eye gaze focused;
- receiving the answers and the inputs as observations for a user defined model; and
- determining the metric by the user defined model based on sets of the observations received during an operating mode of the user defined model, wherein determining the metric includes generating a score for the candidate by the user defined model;

wherein the metric provides a basis for predicting candidate selections and a selection threshold for the metric is initially set by the user, wherein the generated score for the candidate deviates from an optimum score responsive to the determining that the candidate revised the one of the parts of the resume to match the one of the parts of the job description on which the candidate's eye gaze focused;

the method further comprising:
receiving, for a machine learning model, additional ones of the observations, wherein the additional ones of the observations include actual candidate selections;
training the machine learning model on the additional ones of the observations; and
modifying at least the selection threshold by the machine learning model trained on the additional observations.

2. The method of claim 1, wherein the inputs include keyboard keystrokes of the candidate when answering the questions.

3. The method of claim 1, wherein the inputs include records of day-to-day technical contributions of the candidate, network searches of the candidate and results of network searches viewed by the candidate.

4. A computer system for determining at least one metric for an employment candidate, the computer system comprising:
- a processor; and
- a computer readable storage medium connected to the processor, wherein the computer readable storage medium has stored thereon a program for controlling the processor, and wherein the processor is operative with the program to execute the program for:
  providing to an employment candidate, by the computer system via a network, information regarding an available job, wherein the information includes a description of the job and questions for the candidate and wherein the information is configured for presentation on a device used by the candidate;
  receiving, from the device by the computer system via the network and in response to the information being presented to the candidate, answers of the candidate and inputs indicating actions of the candidate other than the answers, wherein the inputs include eye gaze of the candidate when the candidate is presented the job description and revisions made by the candidate to the candidate's resume; and
  determining a metric by the computer system responsive to the answers and the inputs, wherein the determining the metric comprises:
  - determining parts of the job description on which the candidates eye gaze focuses;
  - comparing revisions to the resume by the candidate to the job description parts on which the candidate's eye gaze focuses;
  - determining in response to the comparing that the candidate revised one of the parts of the resume to match one of the parts of the job description on which the candidate's eye gaze focused;
  - receiving the answers and the inputs as observations for a user defined model; and
  - determining the metric by the user defined model based on sets of the observations received during an operating mode of the user defined model, wherein determining the metric includes generating a score for the candidate by the user defined model;

wherein the metric provides a basis for predicting candidate selections and a selection threshold for the metric is initially set by the user, wherein the generated score for the candidate deviates from an optimum score responsive to the determining that the candidate revised the one of the parts of the resume to match the one of the parts of the job description on which the candidate's eye gaze focused;

the method further comprising:
receiving, for a machine learning model, additional ones of the observations, wherein the additional ones of the observations include actual candidate selections;
training the machine learning model on the additional ones of the observations; and
modifying at least the selection threshold by the machine learning model trained on the additional observations.

5. The computer system of claim 4, wherein the inputs include keyboard keystrokes of the candidate when answering the questions.

6. The computer system of claim 4, wherein the inputs include records of day-to-day technical contributions of the candidate, network searches of the candidate and results of network searches viewed by the candidate.

7. A computer program product for determining at least one metric for an employment candidate, including a computer readable storage medium having instructions stored thereon for execution by a computer system, wherein the instructions, when executed by the computer system, cause the computer system to implement a method comprising:
providing to an employment candidate, by the computer system via a network, information regarding an available job, wherein the information includes a description of the job and questions for the candidate and wherein the information is configured for presentation on a device used by the candidate;
receiving, from the device by the computer system via the network and in response to the information being presented to the candidate, answers of the candidate and inputs indicating actions of the candidate other than the answers, wherein the inputs include eye gaze of the candidate when the candidate is presented the job description and revisions made by the candidate to the candidate's resume; and determining a metric by the computer system responsive to the answers and the inputs, wherein the determining the metric comprises:
  determining parts of the job description on which the candidate's eye gaze focuses;
  comparing revisions to the resume by the candidate to the job description parts on which the candidate's eye gaze focuses;
  determining, in response to the comparing, that the candidate revised one of the parts of the resume to match one of the parts of the job description on which the candidate's eye gaze focused;
  receiving the answers and the inputs as observations for a user defined model; and
  determining the metric by the user defined model based on sets of the observations received during an operating mode of the user defined model, wherein determining the metric includes generating a score for the candidate by the user defined model;
wherein the metric provides a basis for predicting candidate selections and a selection threshold for the metric is initially set by the user, wherein the generated score for the candidate deviates from an optimum score responsive to the determining that the candidate revised the one of the parts of the resume to match the one of the parts of the job description on which the candidate's eye gaze focused;
the method further comprising:
receiving, for a machine learning model, additional ones of the observations, wherein the additional ones of the observations include actual candidate selections;
training the machine learning model on the additional ones of the observations; and
modifying at least the selection threshold by the machine learning model trained on the additional observations.

8. The computer program product of claim 7, wherein the inputs include keyboard keystrokes of the candidate when answering the questions.

9. The computer program product of claim 7, wherein the inputs include records of day-to-day technical contributions of the candidate, network searches of the candidate and results of network searches viewed by the candidate.

10. The method of claim 1, comprising:
  determining in response to the comparing that the one of the parts of the resume that the candidate revised did not match the one of the parts of the job description prior to the candidate revising the one of the parts of the resume.

11. The computer system of claim 4, wherein the processor is operative with the program to execute the program for:
  determining in response to the comparing that the one of the parts of the resume that the candidate revised did not match the one of the parts of the job description prior to the candidate revising the one of the parts of the resume.

12. The computer program product of claim 7, wherein the instructions, when executed by the computer system, cause the computer system to implement a method comprising:
  determining in response to the comparing that the one of the parts of the resume that the candidate revised did not match the one of the parts of the job description prior to the candidate revising the one of the parts of the resume.

* * * * *